US008024064B1

(12) United States Patent
Sanghavi et al.

(10) Patent No.: US 8,024,064 B1
(45) Date of Patent: Sep. 20, 2011

(54) PLACEMENT OF INVENTORY IN A MATERIALS HANDLING FACILITY

(75) Inventors: Kaushal A. Sanghavi, Seattle, WA (US); Kalyanaraman Prasad, Seattle, WA (US); Xiao Yu Li, Seattle, WA (US); Pradeep Desai, Bellevue, WA (US); Han S. Lee, Issaquah, WA (US); Nadia Shouraboura, Newcastle, WA (US)

(73) Assignee: Amazon Technologies, Inc., Reno, NV (US)

( * ) Notice: Subject to any disclaimer, the term of this patent is extended or adjusted under 35 U.S.C. 154(b) by 617 days.

(21) Appl. No.: 12/164,636

(22) Filed: Jun. 30, 2008

(51) Int. Cl.
*G06F 12/00* (2006.01)
*G06F 1/14* (2006.01)
*G06F 7/00* (2006.01)

(52) U.S. Cl. .......... 700/226; 711/165; 711/114; 705/28; 700/213

(58) Field of Classification Search .................. None
See application file for complete search history.

(56) References Cited

U.S. PATENT DOCUMENTS

| | | | |
|---|---|---|---|
| 2003/0101107 A1* | 5/2003 | Agarwal et al. | 705/28 |
| 2004/0039891 A1* | 2/2004 | Leung et al. | 711/165 |
| 2007/0293978 A1* | 12/2007 | Wurman et al. | 700/213 |

* cited by examiner

*Primary Examiner* — Gene Crawford
*Assistant Examiner* — Yolanda Cumbess
(74) *Attorney, Agent, or Firm* — Thomas, Kayden, Horstemeyer & Risley, LLP

(57) ABSTRACT

In various embodiments, approaches for the placement of inbound inventory in a materials handling facility are described. A product identifier is input from inbound inventory into a computer system, where the inbound inventory is to be stocked in a materials handling facility. At least one available inventory location is identified in the computer system that presents a lowest cost for storage of the inbound inventory in the materials handling facility. The inbound inventory is stocked in the at least one available inventory location contemporaneously with the determination of the at least one available inventory location in the computer system that presents the lowest cost for storage of the inbound inventory in the materials handling facility.

23 Claims, 3 Drawing Sheets

PLACEMENT OF INVENTORY IN A MATERIALS HANDLING FACILITY

BACKGROUND

In materials handling facilities, inventory is typically stored in various locations and is accessed when needed in order to fulfill orders for goods by customers. The state of a materials handling facility is constantly changing as items are stocked and as various inventory is depleted over time. It can be difficult in such a constantly changing environment to position inventory for optimal performance of the materials handling facility.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the disclosure. Moreover, in the drawings, like reference numerals designate corresponding parts throughout the several views.

DETAILED DESCRIPTION

Figure 1:
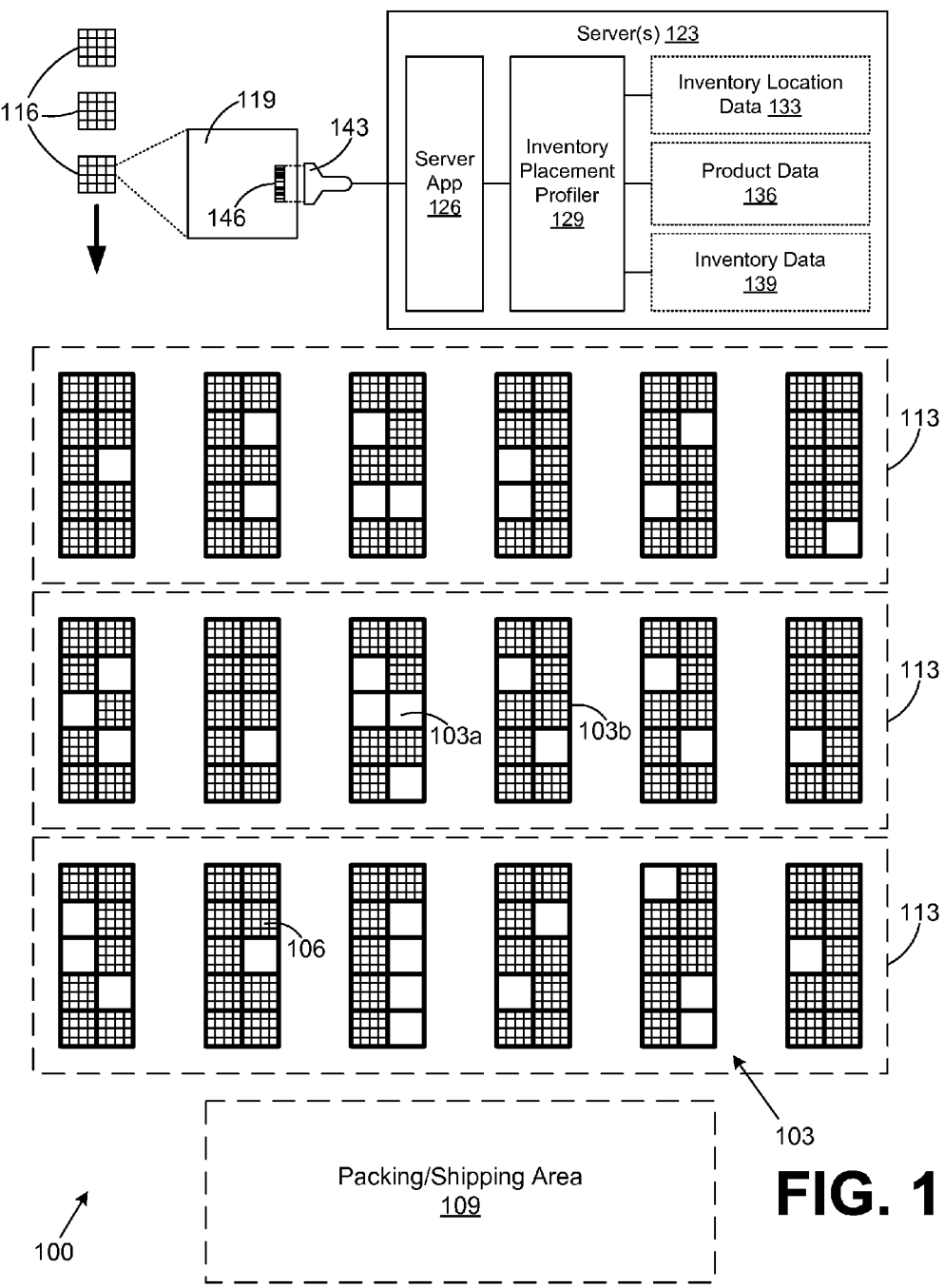
FIG. 1 is a drawing of a materials handling facility according to an embodiment of the present disclosure.

With reference to FIG. 1, shown is a drawing that depicts one example of a materials handling facility 100 according to an embodiment of the present disclosure. A materials handling facility 100 may include one or more of, but are not limited to, warehouses, distribution centers, cross-docking facilities, order fulfillment centers (also referred to as fulfillment facilities), packaging facilities, shipping facilities, or other facilities or combination of facilities for performing one or more functions of material (inventory) handling. Although the materials handling facility 100 is described herein with specific reference to a fulfillment center, it is understood that a materials handling facility 100 provides one example of many other types of environments to which the principles described herein apply.

According to the illustration provided herein, the materials handling facility 100 may comprise, for example, a large warehouse or other structure that includes a plurality of inventory locations 103, such as bins, slots, shelves, containers, receptacles, crates, stalls, cribs, cordoned areas, or other locations, etc. An inventory of items is stored in the inventory locations 103 as can be appreciated. The inventory locations 103 comprise both "available" inventory locations 103a and "occupied" inventory locations 103b. An available inventory location 103a is one that is empty, nearly empty, or otherwise available such that it may be used to stock inbound inventory. An inventory location 103a that is nearly empty may be deemed to be available for storage of new inventory if it is known that the remaining items in the inventory location 103a will likely be removed before the new inventory is stocked therein. This may be known based on sales velocity of a given item stored in a nearly empty inventory location 103a as can be appreciated.

An occupied inventory location 103b is one in which inventory is already stored and cannot be used to store new inbound inventory that does not match the inventory already stored therein. Thus, stored inventory 106 is stored in the occupied inventory locations 103b in the materials handling facility 100.

In one embodiment, the materials handling facility 100 is configured to process orders for goods from customers. The inventory stored in the inventory locations 103 is accessed to fulfill the orders from customers as might be the case, for example, where the materials handling facility 100 comprises a fulfillment center.

To this end, the materials handling facility 100 includes a packing/shipping area 109 where items taken from the inventory locations 103 are packed and shipped to various destination addresses. The inventory locations 103 are arranged into storage zones 113 that are defined based upon their distance from the packing/shipping area 109. Specifically, inventory locations 103 in storage zones 113 that are closer to the packing/shipping area 109 are employed to store inventory that is processed through the materials handling facility 100 at a greater velocity. Also, inventory locations 103 in storage zones 113 that are farther away from the packing/shipping area 109 are employed to store inventory that is processed through the materials handling facility 100 at a lesser velocity.

Where the materials handling facility 100 comprises a fulfillment center, agents, or "pickers," within the materials handling facility 100 perform the role of fulfilling orders for items purchased by customers. Specifically, agents perform the task of gathering, storing, or sorting items from inventory locations 103 in the materials handling facility 100 to fulfill orders for goods that are shipped to the customers. Such items may be sorted, packaged, and shipped in the packing/shipping area 109.

The materials handling facility 100 further comprises one or more servers 123 that are employed for various operational purposes. Specifically, the servers 123 may facilitate inventory control, pick orchestration, control of automated equipment, and other purposes. The servers 123 may comprise computer systems or other systems with like capability.

The materials handling facility 100 receives inbound inventory 116 from various suppliers and manufacturers. The inbound inventory 116 comprises items 119 such as products to be sold to customers or other items as can be appreciated. According to one embodiment, various applications are executed on the one or more servers 123 to facilitate placement of inbound inventory 116 in various inventory locations 103. Among the applications executed in the one or more servers 123 are a server application 126 and an inventory placement profiler 129. There may be many other applications executed in the one or more servers 123 beyond those specifically described herein, however a detailed explanation of such other applications is omitted herein.

In addition, various data is stored in memory that is accessible to the various applications executed in the one or more servers 123. Such data includes, for example, inventory location data 133, product data 136, and inventory data 139. The inventory location data 133 provides information about each of the inventory locations 103 in the materials handling facility 100 that is used in the placement of inbound inventory 116 as will be described. The product data 136 comprises information about each of the products that make up the inventory in the materials handling facility 100. Specifically, the product data 136 may include information such as the name and type of product, the size and shape of products, and other information. The inventory data 139 is used for inventory control in the materials handling facility 100 and includes the quantities of each inventory item as well as the inventory location 103 where such items are stored. The inventory data 139 may be maintained or otherwise accessed by an appropriate inventory control system as can be appreciated.

The materials handling facility 100 further comprises one or more input devices 143 that are employed to input product identifiers 146 from items 119 in inbound inventory 116 into the servers 123 to be processed by the inventory placement profiler 129. Specifically, based upon a product identifier 146 input from a sample item 119 taken from a predefined quantity of inbound inventory 116 of the item 119, the inventory placement profiler 129 performs a cost analysis to determine where the inbound inventory 116 should be placed in the materials handling facility 100 as will be described. The product identifiers 146 may comprise, for example, a Universal Product Code (UPC), Global Trade Item Numbers (GTIN), European Article Number (EAN), International Standard Serial Number (ISSN), International Standard Book Number (ISBN), or other type of identifier. The input devices 143 may comprise, for example, a scanner, camera, keyboard, or other input device.

Next is a discussion of the operation of the materials handling facility 100 described above. The materials handling facility 100 is constantly changing over time as inbound inventory 116 is received and stocked in various inventory locations 103, and as inventory items 119 are removed from the respective inventory locations 103 to fulfill orders from customers or other entities. Due to this flow of inventory into and out of the materials handling facility 100, the state of the various inventory locations 103 is constantly changing between available and occupied.

Thus, at any given moment, the available inventory locations 103a into which inbound inventory 116 may be stored in the materials handling facility 100 changes over time. According to various embodiments, when inbound inventory 116 is to be stocked in the materials handling facility 100, a determination is made as to the one or more available inventory locations 103a that present the lowest cost for storage of the inbound inventory 116 in the materials handling facility 100.

Specifically, when inbound inventory 116 is received at the materials handling facility 100, one or more product identifiers 146 associated with such inbound inventory 116 is input into the server 123. In this respect, such a product identifier 146 may comprise a UPC code or other type of code as described above that is scanned using an appropriate scanner 143 and input into the server 123. Alternatively, product identifiers 146 may be input into the server 123 using some other appropriate input device such as a keyboard, microphone, photo-imaging, or other device. A product identifier 146 may be positioned on an inventory item 119 itself, or on a box or carton that houses one or more inventory items 119 as can be appreciated. In this process, the total quantity of a given type of inventory items 119 may be determined as can be appreciated.

Multiple different inventory items 119 of inbound inventory 116 may be scanned before being stocked in the materials handling facility 100 contemporaneously with each other. In such case, stocking personnel may place multiple different inventory items 119 onto the same stocking cart before scanning the respective product identifiers 146 and ultimately heading out into the materials handling facility 100 to stock the inventory items 119.

The server application 126 is configured to receive the one or more product identifiers 146 taken from the inbound inventory 116 that is to be stocked in the materials handling facility 100. The server application 126 then calls the inventory placement profiler 129 to determine one or more available inventory locations 103a that present a lowest cost for the storage of the inbound inventory 116 in the materials handling facility 100. In doing this, the inventory placement profiler 129 may consult the inventory location data 133, the product data 136, and the inventory data 139. Ultimately, the inventory placement profiler 129 calculates a cost for each one of a plurality of different storage configurations that involve different combinations of one or more available inventory locations 103a into which one or more inventory items 119 may be stored.

Once a cost figure has been determined for each one of the storage configurations, then according to one embodiment, a lowest cost storage configuration is employed for the storage of the inbound inventory 116. A storage configuration may comprise one or more available inventory locations 103a. Once a determination has been made of the lowest cost inventory configuration for the storage of the inbound inventory 116, then according to one embodiment, the inbound inventory 116 is immediately stored in the respective available inventory locations 103a associated with the lowest cost inventory configuration. The inventory placement profiler 129 is configured to render an output to personnel by way of a display screen, printer, or other output that identifies the available inventory locations 103a to be used to store the one or more inventory items 119 in the inbound inventory 116.

To this end, a determination of the one or more available inventory locations 103a that present the lowest cost for storage of the inbound inventory 116 occurs contemporaneously with the stocking of the inbound inventory 116 in the one or more available inventory locations 103a. According to one embodiment, the term "contemporaneously" refers to the fact that the stocking of the inbound inventory 116 occurs either immediately after or soon after the determination is made as to the one or more available inventory locations 103a into which the inbound inventory 116 is to be stored in the materials handling facility 100.

In one embodiment, the concept of stocking the inbound inventory 116 contemporaneously with the determination as to the available inventory locations 103a to be employed to store the inbound inventory 116 takes into account that the available inventory locations 103a are constantly changing in the materials handling facility 100. To this end, the stocking of inbound inventory 116 is contemporaneous with the determination of the available inventory locations 103a to be used when the inbound inventory 116 is stocked in the determined available inventory locations 103a before the pool of available inventory locations 103a taken into account changes substantially.

This reflects the fact that if the pool of available inventory locations 103a substantially changes after the one or more lowest cost available inventory locations 103a have been ascertained, then it is possible that the lowest cost available inventory locations 103a may no longer be in fact the lowest cost available inventory locations 103a. Thus, according to various embodiments, the determination of the one or more available inventory locations 103a that present the lowest cost for the storage of inbound inventory 116 is made contemporaneously with the stocking of the inbound inventory 116. This ensures that the cost analysis performed by the inventory placement profiler 129 is temporally relevant to the state of the materials handling facility 100 at any given moment. It should be understood, however, that it may not be possible to stock inbound inventory 116 before the pool of available inventory locations 103a changes to some extent. However, the contemporaneous stocking of inbound inventory 116 in the determined available inventory locations 103 ensures that the cost determination is substantially relevant to the pool of available inventor locations 103 when the inbound inventory 116 is actually placed in the respective available inventory locations 103a.

In addition, according to one embodiment, when the costs associated with each potential storage configuration for inbound inventory are calculated, it may be the case that some other storage configuration is selected besides the lowest cost storage configuration for the storage of the inbound inventory 116. In this respect, other criteria besides the lowest cost may be considered in selecting a given storage configuration for the storage of inbound inventory 116.

In order to identify the optimum storage configuration of one or more available inventory locations 103a at which inbound inventory 116 is to be stored at any given moment, the inventory placement profiler 129 is configured to calculate a cost associated with the storage of the inbound inventory 116 in each one of a plurality of storage configurations. Each storage configuration may comprise a combination of one or more available inventory locations 103a as described above. The storage configuration may be calculated for one or more inventory items 119 included in the inbound inventory 116. The cost for each of the storage configurations may be calculated using a cost function as follows:

$$Cost = C_1 f_1 + C_2 f_2 + C_3 f_3 + C_4 f_4 + C_5 f_5 + \ldots + C_N f_N,$$

where the $f_n$ refers to various cost factors, and $C_n$ are weighting coefficients. The cost factors $f_n$ may vary in magnitude, for example, from 0 to 1, or other range that may be deemed appropriate. The weighting coefficients may vary in magnitude, for example, from 0 to 1, or other range that may be deemed appropriate.

Each of the different cost factors $f_n$ employed in the equation above relate to the operation of the materials handling facility 100, the characteristics of the inbound inventory 116, and other aspects. The cost factors $f_n$ may be calculated with respect to individual inventory items 119 of inbound inventory 116, or the cost factors $f_n$ may be calculated based on multiple inventory items 119 to be stocked together as described above. Where multiple inventory items 119 are stocked together, a cost factor $f_n$ may be calculated for the group of inventory items 119 based on cost factors $f_n$ calculated for individual inventory items 119 by averaging, etc.

A first one of the cost factors $f_n$ may involve a "picking productivity." The picking productivity involves the cost of picking an inventory item 119 out of a given inventory location 103 to be packed and shipped in the packing/shipping area 109. Such activity may be deemed "pre-shipment activity." The picking productivity may be calculated based upon the nature of a given inventory location 103, the nature of an inventory item 119 to be picked, or other factors. For instance, the picking productivity may depend upon the distance between a given inventory location 103 and the packing/shipping area 109, assuming that all picked inventory items 119 are ultimately taken to the packing/shipping area 109 to be packed and shipped. This reflects the greater amount of time a picker may be in transit with a picked inventory item 119 or a greater amount of time an inventory item 119 spends on a conveyor.

To this end, the picking productivity may depend upon the storage zone 113 within which a given inventory location 103 is located. Further, where inventory locations 103 comprise bins or shelves, then the picking productivity may further depend upon the height of the respective bin or shelf. For example, higher picking productivity is assigned for shelves that are easily accessible such as those that are waist high as opposed to those that are at or about shoulder level, or at ground level.

Also, picking productivity may further depend upon the nature of the inventory item 119 picked. Specifically, where an inventory item 119 is very large or bulky, it may require multiple pickers for proper handling as opposed to smaller items that can be picked by a single picker. Also, some inventory items 119 may require the use of predefined picking procedures to prevent damage or injury. Such may be the case, for example, with heavy electronic equipment such as large screen televisions and the like.

Based upon the above described factors or other factors not described herein, a cost factor associated with the picking productivity for picking an inventory item 119 from a given inventory location 103 may be determined. By taking all of the above concepts into account, a number may be determined for the factor $f_n$ that represents the picking productivity that may be employed in the equation above.

Another cost factor $f_n$ that may be employed in the cost function above is "space utilization." Space utilization refers to how well a given inventory item 119 fits within a given inventory location 103. Specifically, if the inventory item 119 is of an awkward shape or size relative to the inventory location 103, then there may be a limit to the number of a specific type of inbound inventory 116 that can actually be stored in a given inventory location 103. The cost factor $f_n$ for space utilization may be calculated depending upon how well a quantity of a given inventory item 119 employs the space associated with one or more inventory locations 103. Where space utilization is poor such that a significant amount of empty space results, then this factor may be relatively low for such an inventory location 103. Alternatively, where a given quantity of an inventory item 119 fits well within an inventory location 103 and employs most of the space available, then the value of the cost factor $f_n$ for space utilization may be relatively high.

Another cost factor $f_n$ to consider in the cost function involves the global impact within the materials handling facility 100 by the placement of the inbound inventory 116 in the identified inventory locations 103 for which the cost analysis is performed. Specifically, once a given quantity of a type of inbound inventory 116 is placed into one or more inventory locations 103, they can displace other future anticipated inbound inventory 116 that it is known will be received that might have been placed in such inventory locations 103. In some situations, it may be more desirable to place the inventory not yet received in such inventory locations 103 rather than current inbound inventory 116.

Thus, to assess the global impact a given product may have on the costs associated with the placement of other inventory in the materials handling facility 100, a cost factor $f_n$ for the global impact of the placement of inbound inventory 103 may be calculated for a given storage configuration of one or more inventory locations 103. This cost factor may be calculated based on products that it is known will be received by the materials handling facility 100 in the future based upon ordering information, sales forecasts, and other data stored in the product data 136.

The cost factor $f_n$ for the global impact may be set as a high value if placement of a given quantity of an inventory item 119 in a respective inventory location 103 would adversely affect the placement of other inventory items 119 that have been received or that will be received in the future. Conversely, the same cost factor $f_n$ may be relatively low if the placement of the quantity of the inventory item 119 does not adversely affect the product placement of other inventory items 119 as described above.

Yet another cost factor $f_n$ that is taken into account in the cost function above is a "stocking productivity." The stocking productivity relates to the cost of stocking a quantity of one or more inventory items 119 into one or more inventory locations 103 associated with a given storage configuration. This cost factor $f_n$ may be calculated based upon the distance that the respective inbound inventory 116 is transported within the materials handling facility 100 from a point of receipt to the respective inventory locations 103. Where multiple inventory items 119 are placed on the same stocking cart, for example, the stocking productivity may relate to the stocking of the multiple inventory items 119 in the inbound inventory 116. Specifically, the stocking productivity may be calculated based upon the distances between respective inventory locations 103 for a given storage configuration to be potentially used to store the multiple inventory items 119. This reflects the fact that if the multiple inventory items 119 are stocked in inventory locations 103 that are relatively close to each other, then the cost factor for stocking productivity is reduced due to the lesser distance stocking personnel will have to traverse while stocking the inbound inventory 116.

Also, the cost factor $f_n$ for stocking productivity may also depend upon the cost of placing respective inventory items 119 into respective inventory locations 103. To this end, the cost may vary depending upon the nature of the inbound inventory 116 (i.e. bulky or large products as opposed to small or easily handled products). In addition, there are other costs that may be associated with the stocking productivity as can be appreciated.

Still another cost factor $f_n$ that is taken into account in the cost function above is the throughput of inventory items 119 through the materials handling facility 100. This relates to the turnaround rate through the materials handling facility 100 that exists for a given product stored in respective inventory locations 103. The throughput may relate to the sales velocity of a given item and the location of a given inventory location 103 within the materials handling facility 100. Specifically, the cost factor $f_n$ associated with inventory locations 103 that are close to the packing/shipping area 109 for inbound inventory 116 with high throughput may be deemed relatively low. Conversely, the cost factor $f_n$ associated with inventory locations 103 that are close to the packing/shipping area 109 for inbound inventory 116 with low throughput may be deemed relatively high. This reflects the fact that inbound inventory 116 with low throughput placed in inventory locations 103 close to the packing/shipping area 109 may displace other future inbound inventory 116 that experiences high throughput. Thus, it is desirable to place inbound inventory 116 with a high sales velocity closer to the packing/shipping area 109 to minimize picker traffic and other factors within the materials handling facility 100.

Based on the foregoing discussion, values for each relevant cost factor $f_n$ may be identified. Although specific cost factors are described above, it is understood that other cost factors $f_n$ may be taken into account in the cost function above. In some cases, the cost factors $f_n$ may be calculated specifically based upon cost information about the operation of the materials handling facility 100, product information, sales forecasts, inventory information, and other information. Alternatively, it may be the case that the cost factors $f_n$ are determined based upon experience of running the materials handling facility 100 over time. In addition, the cost factors $f_n$ may be determined using predefined equations or formulas that take into account the various factors described above.

The weighting coefficients $C_{1-n}$ are employed to weight the respective factors relative to each other. The weighting coefficients $C_{1-n}$ may be determined based upon experience running the materials handling facility 100 over time. For example, the weighting coefficients $C_{1-n}$ may be determined depending upon the time of year based upon experience within the materials handling facility 100. For example, in the springtime, throughput, global impact, stocking productivity, and space utilization may be weighted more heavily than picking productivity where slower sales periods are experienced. Alternatively, during the holiday shopping season, it may be the case that picker productivity is weighted heavier than most other factors given the fact that significant numbers of temporary employees may be hired for the shopping season to perform the picking function. The weighting coefficients $C_{1-n}$ may be specified using an automated system that is configured to adjust the weighting coefficients $C_{1-n}$ over time.

In addition, there may be various constraints placed upon the use of inventory locations 103 for specific types of inbound inventory 116. For example, the available inventory locations 103 that can be used for the storage of some inbound inventory 116 may be limited due to unusual shapes or sizes of the inbound inventory 116, safety concerns, or other reasons. Also, inbound inventory 116 comprising various hazardous materials may be restricted to storage in certain inventory locations 103 suitable for the storage of such materials.

Also, some inventory locations 103 may be disqualified for use in storing certain inbound inventory 116 given that similar inventory is already stored adjacent to or near such inventory locations 103. This relates, for example, to quality control in a fulfillment center. Specifically, if inbound inventory 116 includes 200 hammers manufactured by a first manufacturer, it might be unwise to position such inbound inventory 116 in an inventory location 103 adjacent to an inventory location 103 that holds hammers manufactured by a second manufacturer. This is because confusion may result and pickers might pick the wrong item due to the close proximity of the respective inventory items 119. Further, there may be safety constraints that limit the use of given inventory locations 103 for different types of inventory.

The constraints may comprise soft constraints or hard constraints. A soft constraint is one that is aspired to in which attempts are made to follow the constraint if possible. Alternatively, a constraint may be a hard constraint that must be followed in placing inbound inventory 116 into respective inventory locations 103, or by avoiding placing certain inbound inventory 116 in certain inventory locations 103.

Figure 2:
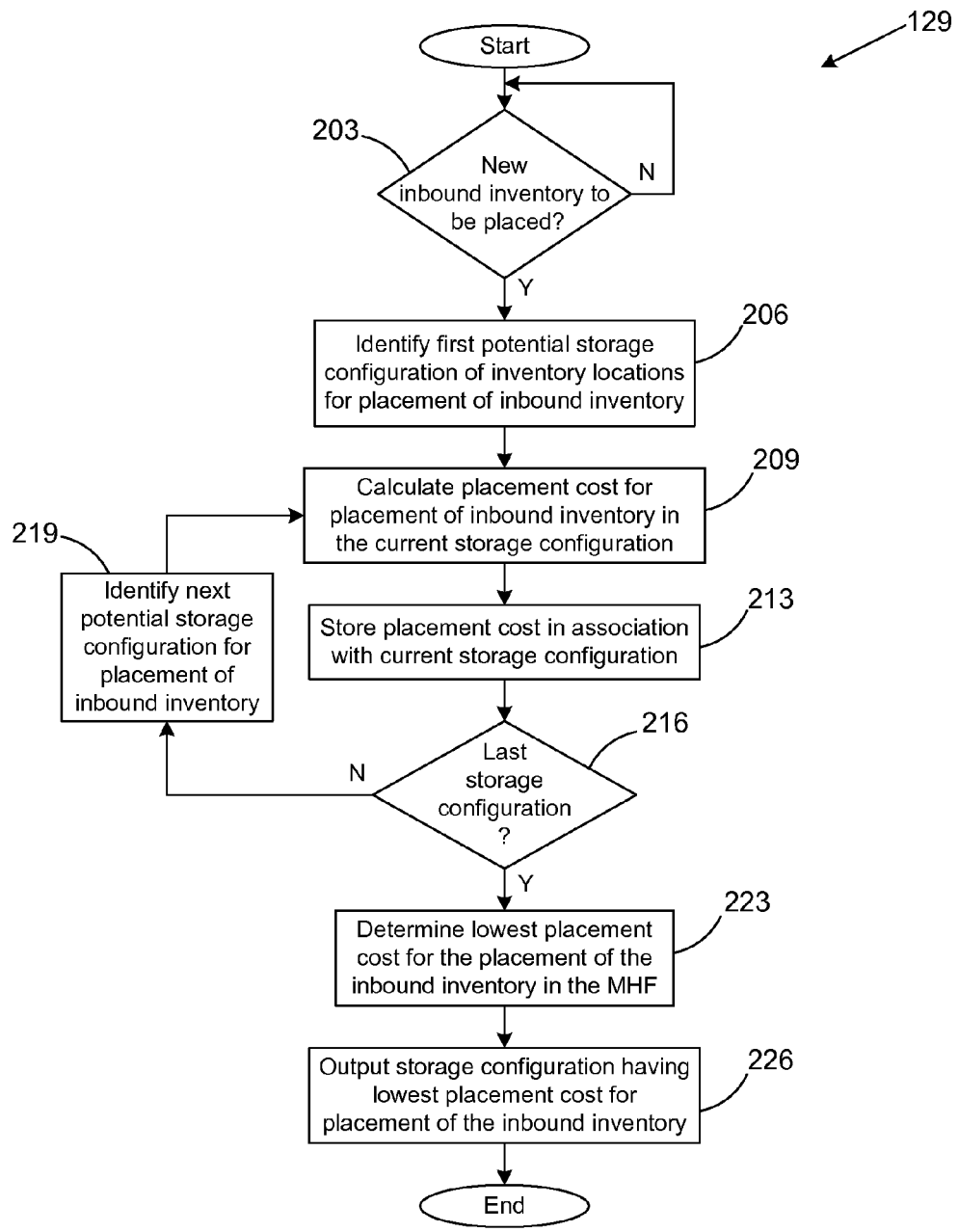
FIG. 2 is a drawing of a flow chart that illustrates one example of the operation of an inventory placement profiler implemented in the materials handling facility of FIG. 1 according to an embodiment of the present disclosure.

Referring next to FIG. 2, shown is a flow chart that provides one example of the operation of the inventory placement profiler 129 according to an embodiment of the present invention. Alternatively, the flow chart of FIG. 2 may be viewed as depicting steps of an example method implemented in the server(s) 123 (FIG. 1) to determine a storage configuration of one or more inventory locations 103 (FIG. 1) for the storage of inbound inventory 116 (FIG. 1). The inventory placement profiler 129 acts upon a product identifier 146 (FIG. 1) input to the server 123 as described above.

Beginning with box 203, the inventory placement profiler 129 waits to receive one or more product identifiers 146 associated with inbound inventory 116 to be placed within the materials handling facility 100 (FIG. 1). Assuming that there is inbound inventory 116 to be placed in the materials handling facility 100, then in box 206, the inventory placement profiler 129 identifies a first potential storage configuration comprising one or more available inventory locations 103a (FIG. 1) for the placement of the inbound inventory 116 associated with the product identifier 146.

Thereafter, in box 209, the inventory placement profiler 129 calculates a placement cost using the cost function described above for the placement of the inbound inventory 116 in the current storage configuration under consideration. Thereafter, in box 213, the calculated placement cost is stored in a memory in association with the current storage configuration under consideration. Thereafter, in box 216, the inventory placement profiler 129 determines whether the last possible storage configuration of available inventory locations 103a has been considered. If not, then the inventory placement profiler 129 proceeds to box 219. Otherwise, the inventory placement profiler 129 progresses to box 223.

In box 219, the inventory placement profiler 129 identifies a next potential storage configuration that may be employed for the placement of the inbound inventory 116. Thereafter, the inventory placement profiler 129 reverts back to box 209 to calculate the cost for replacement in the currently identified storage configuration. The storage configurations may comprise each of the available inventory locations 103a individually and any combination of available inventory locations 103a.

Further, a limit may be imposed on the total number of inventory locations 103a that may be combined to store like inventory items 119 in inbound inventory 116. Alternatively, the number of available inventory locations 103a in a given storage configuration may depend upon the number or combination needed to accommodate each like inventory item 119 included in inbound inventory 116. Thus, criteria may be set that only storage configurations may be considered that will ultimately accommodate all of the like inventory items 119 of inbound inventory 116.

Assuming that the last storage configuration has been considered in box 216, then the inventory placement profiler 129 proceeds to box 223 in which criteria is applied to determine which storage configuration is to be employed for the placement of the inbound inventory 116. In one embodiment, the storage configuration having the lowest placement cost for the placement of the inbound inventory 116 in the materials handling facility 100 is selected. Then, in box 226, the selected storage configuration having the lowest placement cost or conforming with some other criteria is output or rendered using a printer, display device, or other rendering device for use by personnel in the stocking of the inbound inventory 116 in the materials handling facility 100. According to various embodiments, the function of stocking the inbound inventory 116 is performed contemporaneously with the outputting or rendering of the selected storage configuration as described above.

Figure 3:
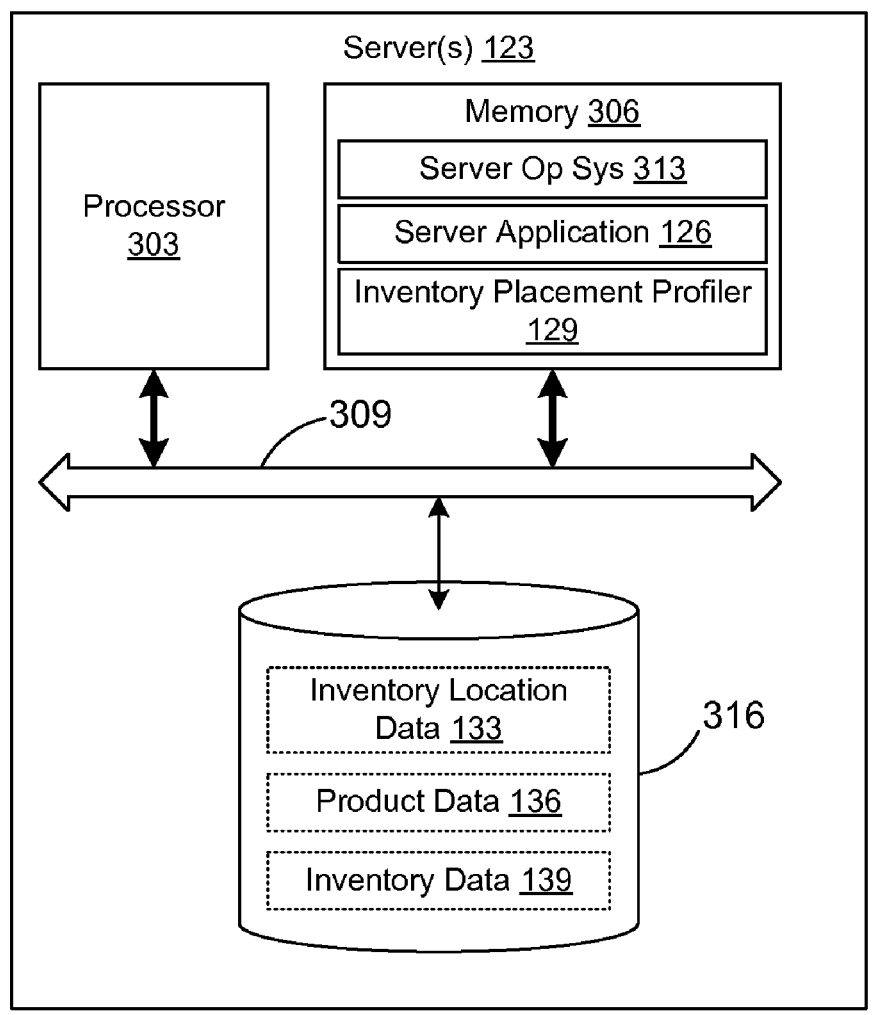
FIG. 3 is a drawing of a server used to implement the inventory placement profiler of FIG. 2 according to an embodiment of the present disclosure.

Referring next to FIG. 3, shown is an example of one embodiment of the one or more servers 123 according to various embodiments. The server 123 may include a processor circuit having a processor 303 and a memory 306, both of which are coupled to a local interface 309. The local interface 309 may comprise, for example, a data bus with an accompanying control/address bus as can be appreciated. To this end, each server 123 may comprise, for example, a computer system or other system with like capability. Such computer systems may be configured to optimally perform as servers as can be appreciated.

Various components may be stored in the memory 306 and are executable by the processor 303 including, for example, a server operating system 313, the server application 126, and the inventory placement profiler 129. In addition, other applications may be stored in the memory 306 and executable by the processor 303 as can be appreciated. The inventory location data 133, product data 136, and inventory data 139 may be stored in a database 316 that is accessible by the processor circuit of the server 123 so as to access the various data stored therein. Alternatively, the database 316 may be stored in locations other than within the server 123.

The server operating system 313, the server application 126, and the inventory placement profiler 129 are described as stored in the memory 306 and executable by the processor 303. In this respect, the term "executable" means a program file that is in a form that can ultimately be run by the processor 303. Examples of executable programs may be, for example, a compiled program that can be translated into machine code in a format that can be loaded into a random access portion of the memory 306 and run by the processor 303, or source code that may be expressed in proper format such as object code that is capable of being loaded into a of random access portion of the memory 306 and executed by the processor 303, etc. An executable program may be stored in any portion or component of the memory 306 including, for example, random access memory, read-only memory, a hard drive, compact disk (CD), floppy disk, or other memory components.

The memory 306 is defined herein as both volatile and nonvolatile memory and data storage components. Volatile components are those that do not retain data values upon loss of power. Nonvolatile components are those that retain data upon a loss of power. Thus, the memory 306 may comprise, for example, random access memory (RAM), read-only memory (ROM), hard disk drives, floppy disks accessed via an associated floppy disk drive, compact discs accessed via a compact disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

In addition, the processor 303 may represent multiple processors and the memory 306 may represent multiple memories that operate in parallel. In such a case, the local interface 309 may be an appropriate network that facilitates communication between any two of the multiple processors, between any processor and any one of the memories, or between any two of the memories etc.

The functionality of the inventory placement profiler 129 as depicted by the example flow chart of FIG. 2 may be implemented, for example, in an object oriented design or in some other programming architecture. Assuming the functionality is implemented in an object oriented design, then each block represents functionality that may be implemented in one or more methods that are encapsulated in one or more objects. The inventory placement profiler 129 may be implemented using any one of a number of programming languages such as, for example, C, C++, JAVA, or other programming languages.

With reference to FIGS. 1-3, although the inventory placement profiler 129 is described as being embodied in software or code executed by general purpose hardware above, as an alternative the same may also be embodied in dedicated hardware or a combination of software/general purpose hardware and dedicated hardware. If embodied in dedicated hardware, the same can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those skilled in the art and, consequently, are not described in detail herein.

The flow chart of FIG. 2 shows the functionality and operation of an implementation of the inventory placement profiler 129. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor in a computer system or other system. The machine code may be converted from the source code, etc. If embodied in hardware, each block may represent a circuit or a number of interconnected circuits to implement the specified logical function(s).

Although the flow chart of FIG. 2 shows a specific order of execution, it is understood that the order of execution may differ from that which is depicted. For example, the order of execution of two or more blocks may be scrambled relative to the order shown. Also, two or more blocks shown in succession in FIG. 2 may be executed concurrently or with partial concurrence. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present invention.

Also, where the inventory placement profiler 129 comprises software or code, it can be embodied in any computer-readable medium for use by or in connection with an instruction execution system such as, for example, a processor in a computer system or other system. In this sense, the logic may comprise, for example, statements including instructions and declarations that can be fetched from the computer-readable medium and executed by the instruction execution system. In the context of the present invention, a "computer-readable medium" can be any medium that can contain, store, or maintain the inventory placement profiler 129 for use by or in connection with the instruction execution system. The computer readable medium can comprise any one of many physical media such as, for example, electronic, magnetic, optical, electromagnetic, infrared, or semiconductor media. More specific examples of a suitable computer-readable medium would include, but are not limited to, magnetic tapes, magnetic floppy diskettes, magnetic hard drives, or compact discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A method, comprising the steps of:
   scanning a product identifier from an inbound inventory into a computer system, where the inbound inventory is to be stocked in a materials handling facility;
   determining, in the computer system, at least one available inventory location in the materials handling facility that presents a lowest cost for storage of the inbound inventory by performing the steps of:
   identifying a plurality of available inventory locations for storage of the inbound inventory;
   calculating a cost associated with the storage of the inbound inventory in each one of the available inventory locations using a cost function wherein cost is calculated as a function of at least a stocking productivity associated with the inbound inventory in the respective available inventory locations; and
   identifying the at least one available inventory location as the available inventory location associated with a lowest calculated cost;
   stocking the inbound inventory in the at least one available inventory location contemporaneously with the determination of the at least one available inventory location in the computer system that presents the lowest cost for storage of the inbound inventory in the materials handling facility; and
   where a pool of the available inventory locations that may be used to store the inbound inventory in the materials handling facility changes over time.

2. The method of claim 1, wherein the stocking of the inbound inventory occurs immediately after the determination of the at least one available inventory location in the computer system that presents the lowest cost for storage of the inbound inventory in the materials handling facility.

3. A method, comprising the steps of:
   inputting a product identifier from an inbound inventory into a computer system, where the inbound inventory is to be stocked in a materials handling facility;
   determining at least one available inventory location in the computer system that presents a lowest cost for storage of the inbound inventory in the materials handling facility by determining a plurality of available inventory locations for storage of the inbound inventory and calculating a cost associated with the storage of the inbound inventory in each one of the available inventory locations using a cost function wherein cost is calculated as a function of at least a stocking productivity associated with the inbound inventory in the respective available inventory locations; and
   stocking the inbound inventory in the at least one available inventory location contemporaneously with the determination of the at least one available inventory location in the computer system that presents the lowest cost for storage of the inbound inventory in the materials handling facility.

4. The method of claim 3, wherein the step of determining the at least one available inventory location in the computer system that presents the lowest cost for storage of the inbound inventory in the materials handling facility further comprises the steps of:
   determining a plurality of available inventory locations for storage of the inbound inventory; and
   calculating, for each one of a plurality of sets of the available inventory locations, a cost associated with the storage of the inbound inventory.

5. The method of claim 4, wherein the cost is calculated using a cost function.

6. The method of claim 4, where the at least one available inventory location that presents the lowest cost for storage of the inbound inventory in the materials handling facility comprises the set of available inventory locations for which a lowest one of the costs is calculated.

7. The method of claim 3, wherein the step of stocking the inbound inventory in the at least one available inventory location contemporaneously with the determination of the at least one available inventory location in the computer system that presents the lowest cost for storage of the inbound inventory in the materials handling facility further comprises determining the at least one available inventory location immediately before stocking the inbound inventory in the at least one available inventory location.

8. The method of claim 3, wherein the inputting of the product identifier from the inbound inventory into the computer system further comprises the step of scanning an identifier associated with the inbound inventory.

9. The method of claim 1, where the stocking productivity relates to a stocking of a plurality of inventory items included in the inbound inventory.

10. The method of claim 1, wherein the cost is calculated as a function of a location of an inventory location in the materials handling facility.

11. The method of claim 1, wherein the cost is calculated as a function of throughput of the inbound inventory through the materials handling facility.

12. The method of claim 1, wherein the cost is calculated as a function of pre-shipment activity implemented before the inbound inventory is shipped from the materials handling facility to a destination.

13. The method of claim 1, where the at least one available inventory location that presents the lowest cost for storage of the inbound inventory in the materials handling facility comprises the inventory location for which a lowest one of the costs is calculated.

14. The method of claim 3, wherein the step of stocking the inbound inventory in the at least one available inventory location is implemented before a substantial change occurs in a pool of the available inventory locations that may be used to store the inbound inventory in the materials handling facility.

15. A system, comprising:
a computer system;
an input device configured to input a product identifier from an inbound inventory into the computer system contemporaneously with a stocking of the inbound inventory in a materials handling facility; and
an inventory placement system executed in the computer system to determine the placement of the inbound inventory in the materials handling facility having a plurality of inventory locations, the inventory placement system comprising:
logic that calculates, with a cost function, a cost for each one of a plurality of storage configurations that may be employed for the storage of the inbound inventory in the materials handling facility, the cost function determining the cost for each one of the storage configurations as a function of at least a stocking productivity calculated for the inbound inventory, each storage configuration comprising at least one of the inventory locations; and
logic that outputs a selected one of the storage configurations for the storage of the inbound inventory based upon the costs calculated for each of the storage configurations.

16. The system of claim 15, wherein the selected one of the storage configurations comprises one of the inventory locations.

17. The system of claim 15, wherein the selected one of the storage configurations comprises a plurality of the inventory locations.

18. The system of claim 15, where the input device further comprises a scanner.

19. The system of claim 15, where the stocking productivity relates to a stocking of a group of inventory items included in the inbound inventory.

20. The system of claim 15, where the cost function determines the cost for each one of the storage configurations as a function of a location of an inventory location in the materials handling facility.

21. The system of claim 15, where the cost function determines the cost for each one of the storage configurations as a function of throughput of the inbound inventory through the materials handling facility.

22. The system of claim 15, where the cost function determines the cost for each one of the storage configurations as a function of pre-shipment activity implemented before the inbound inventory is shipped from the materials handling facility to a destination.

23. The system of claim 15, where the cost function determines the cost for each one of the storage configurations as a function of a stocking productivity associated with the inbound inventory.

* * * * *